Dec. 20, 1932.  G. PORTELA  1,891,838
BROODER
Filed May 19, 1931
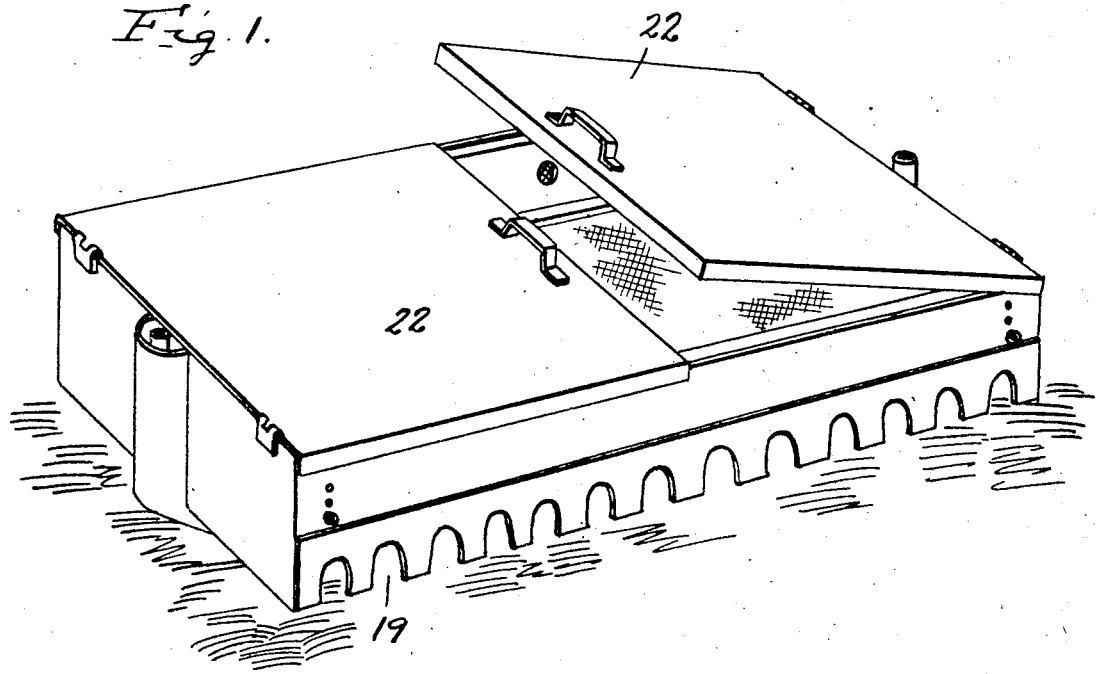
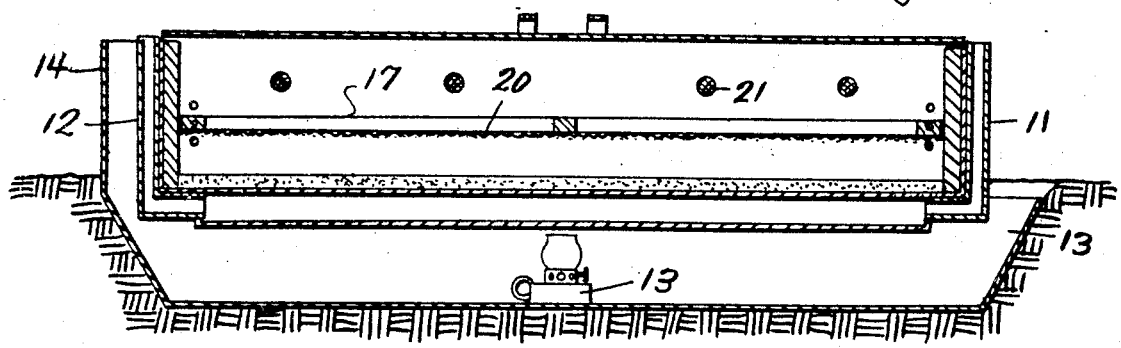
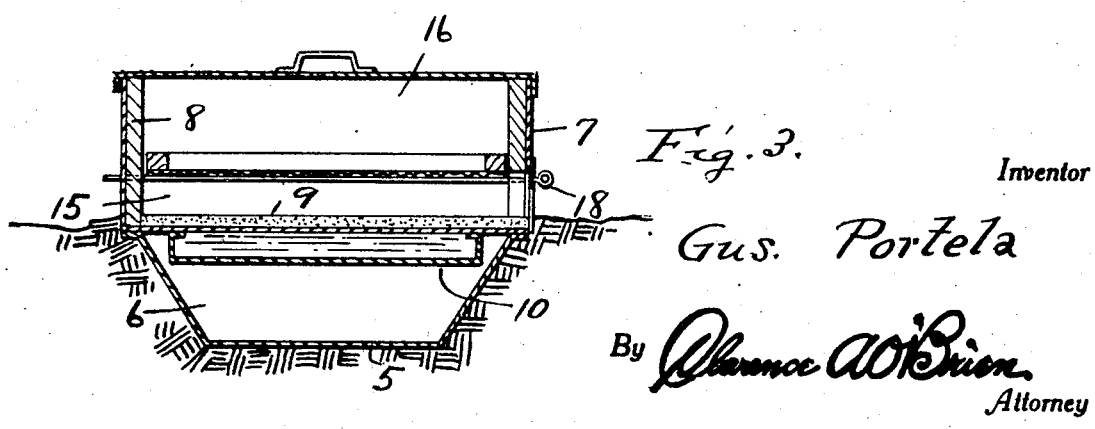
Inventor
Gus. Portela
By Clarence A. O'Brien
Attorney Patented Dec. 20, 1932

1,891,838

UNITED STATES PATENT OFFICE

GUS PORTELA, OF AFTON, WYOMING

BROODER

Application filed May 19, 1931. Serial No. 538,512.

This invention relates to a brooder, and has for its object to provide a brooder device for chickens which affords a housing for the chicks, and which is provided with facilities for heating, to a desirable temperature, a compartment especially provided for the chicks.

Other objects and advantages of the invention will become apparent from a study of the following description, taken in connection with the accompanying drawing wherein:

Figure 1 is a perspective view of the brooder.

Figure 2 is a longitudinal sectional view therethrough.

Figure 3 is a transverse sectional view therethrough.

With reference more in detail to the drawing, it will be seen that the brooder comprises a trough shaped lower portion 5 formed of metal or other suitable material and adapted to be sunk into the ground below the surface thereof and provides for the brooder a heating chamber 6.

Supported on the upper edges of the wall of the member 5 is an elongated rectangular box like section 7 preferably formed of metal, and having the side walls thereof lined by wooden strips 8. The bottom of the section 7 is covered with a layer of fine sand 9 or other suitable material having heat retaining properties. Provided on the bottom wall of the section 7 and extending therefrom into the chamber or compartment 6 is a tank 10 that is filled with water and which is provided with a filling pipe 11 which opens into the tank at one end thereof.

A suitable vent pipe 12 is provided for the tank, and extends from the other end of the tank upwardly adjacent one end wall of the section 7.

Arranged in the chamber 6 is any suitable heating device, as for example a kerosene lamp 13 and obviously the heat from the lamp will heat the water in the tank 10 which in turn will heat the sand 9 thus providing a warm flooring or bed for the chicks housed within the upper section 7. By reason of the water tank 10 an equal distribution of heat will be effected whereby the brooder will be kept at a uniform temperature.

The lamp or heating device 13 may be placed within the chamber 6, or readily removed therefrom at one end of the section 5, said section at one end projecting beyond the corresponding end of the upper section 7 as at 13. For venting the chamber 6, the section 5 at its opposite end merges into a substantially semicylindrical venting neck 14 which at its edges is integral with or otherwise secured to an adjacent wall of the section 7 and the vent tube 14 is disposed about the pipe 12 as shown in the drawing.

The section 7 is divided into a lower compartment 15 for accommodating chicks and an upper air compartment 16 through the medium of a frame member 17 adjustably supported in the section 7 between cross rods 18, opposite walls of the section 7 being each provided with a series of vertically spaced openings for accommodating the rods 18.

In actual practice, and as shown in the drawing, the bottom of the section 7 is preferably disposed at ground level, and one side wall of the section 7 is provided with spaced entrance and exit openings 19 for accommodating the passage of the chicks into and out of the chamber 15.

For warming the backs of the chicks, there is stretched within the frame 17 a sheet of felt, or other suitable fabric 20.

For the compartment 16, there is provided in the walls of the section 7, suitable air ports 21.

The top of the section 7 is open, and suitably hinged doors 22 are provided for said open top. Obviously access to the interior of the section 7 may be had through the top thereof.

Even though I have herein shown and described the preferred embodiment of the invention, it is to be understood that the same is susceptible of changes, modifications and improvements coming within the scope of the appended claims.

Having thus described my invention, what I claim as new is:

1. In a brooder, a trough adapted to be embedded in the ground and open at its opposite ends to the atmosphere, said trough having its opposite sides provided with lateral flanges, a housing comprising a box like structure supported on the flanged sides of said trough and open at its top, said housing being provided with a plurality of entrance and exit openings at substantially the ground level, a heating element arranged within said trough, and hinged doors for closing the top of said housing, a water pan suspended from the bottom of said housing and extending into said trough, a partition horizontally disposed in said housing and dividing the same into a lower chick compartment and an upper air compartment, said partition comprising a sheet of fabric.

2. In a brooder, a trough adapted to be embedded in the ground, and communicating with the atmosphere at its opposite ends, said trough having its opposite sides provided with lateral flanges, a housing supported on the flanged sides of said trough and having its bottom coplanar with the surface of the ground, said housing being provided with a plurality of entrance and exit openings at substantially the ground level, said housing provided with a lower chick compartment and an upper air compartment, and heating means arranged in said trough.

In testimony whereof I affix my signature.

GUS PORTELA.